United States Patent [19]
Marcinkiewicz et al.

[11] Patent Number: 5,457,375
[45] Date of Patent: Oct. 10, 1995

[54] SENSORLESS COMMUTATION CONTROLLER FOR A POLY-PHASE DYNAMOELECTRIC MACHINE

[75] Inventors: Joseph G. Marcinkiewicz; J. Stephen Thorn; James L. Skinner, all of St. Louis, Mo.

[73] Assignee: Emerson Electric Co., St. Louis, Mo.

[21] Appl. No.: 250,017

[22] Filed: May 27, 1994

[51] Int. Cl.$^6$ ..................................... H02P 5/40
[52] U.S. Cl. .................... 318/802; 318/801; 318/803; 318/811
[58] Field of Search .................. 318/138, 254, 318/799–832; 363/39–43, 96–98; 323/266

[56] References Cited

U.S. PATENT DOCUMENTS

| | | | |
|---|---|---|---|
| 4,330,741 | 5/1982 | Nagase et al. | 318/803 |
| 4,418,308 | 11/1983 | Bose | 318/803 |
| 4,680,526 | 7/1987 | Okuyama et al. | 318/802 |
| 4,745,991 | 5/1988 | Tanahashi | 318/801 |
| 4,767,976 | 8/1988 | Mutoh et al. | 318/808 |
| 4,780,650 | 10/1988 | Miyazaki et al. | 318/71 |
| 4,958,117 | 9/1990 | Kerkman et al. | 318/805 |
| 5,140,248 | 8/1992 | Rowan et al. | 318/811 |
| 5,321,599 | 6/1994 | Tanamachi et al. | 363/41 |
| 5,329,217 | 7/1994 | Kerkman et al. | 318/811 |
| 5,384,527 | 1/1995 | Rozman et al. | 322/10 |

Primary Examiner—Paul Ip
Attorney, Agent, or Firm—Polster, Lieder, Woodruff & Lucchesi

[57] ABSTRACT

A BPM or SRM electric motor (M) is supplied bus current. A PWM inverter (I) uses bus current to commutate the motor by Systematically energizing and de-energizing the motor's windings (W) with the current. The resultant bus current waveshape has characteristics that are a function of a commutation angle between a rotor (T) of the machine and its windings. The waveshape includes the effects of bus ripple or transients. A commutation controller (10) samples the waveshape during each commutation interval to obtain commutation angle information. The controller provides control inputs to an inverter (I) to control commutation angle in response to the sample information. Commutation angle control includes calculating a control variable ($I_{curve}$) which is a function of commutation angle. This variable is comprised of sampled data values which are additively combined according to a prescribed formula and which provide a high degree of linearity over a wide range of commutation angles. The controller is further responsive to the motor's impulse response ($H_{motor}(t)$) to reject bus ripple effects on the waveshape samples. By employing the control variable and impulse response, the controller provides appropriate frequency ($f_{out}$) and voltage ($V_{out}$corrected) inputs to the inverter to achieve an optimum commutation angle relationship between the rotor and windings.

41 Claims, 11 Drawing Sheets

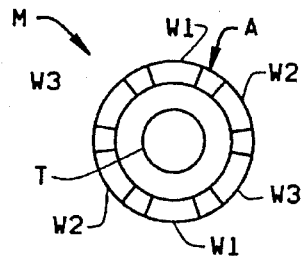
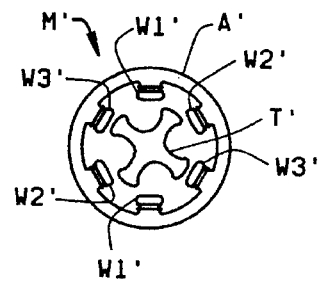
FIG. 2A  FIG. 2B
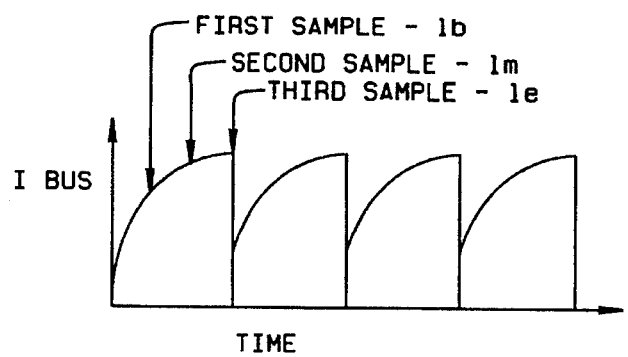
PHASE ERROR CONTROL FUNCTION = [ 2*Ie - 3*Im + IB ]
FIG. 9
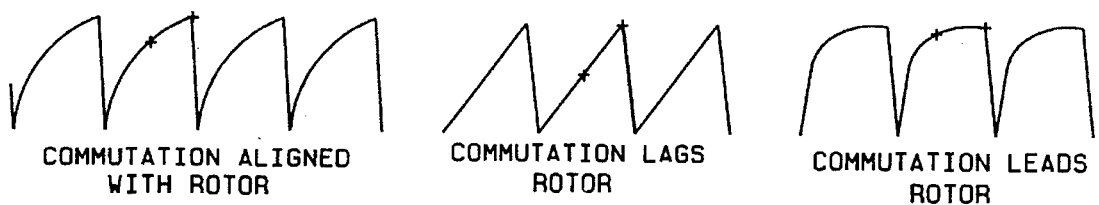
COMMUTATION ALIGNED WITH ROTOR
COMMUTATION LAGS ROTOR
COMMUTATION LEADS ROTOR
FIG. 16A  FIG. 16B  FIG. 16C 5,457,375

SENSORLESS COMMUTATION CONTROLLER FOR A POLY-PHASE DYNAMOELECTRIC MACHINE

BACKGROUND OF THE INVENTION

This invention relates to commutation control of a dynamoelectric machine such as a poly-phase electric motor used in household or similar appliances and, more particularly, to an improved sensorless controller for providing commutation control.

In U.S. patent application 08/004411, filed Jan. 14, 1993, and assigned to the same assignee as the present invention, there is described a method and apparatus for achieving commutation control of a dynamoelectric machine. The particular advantage of the invention described therein was that, unlike prior control methods and circuitry, there was no reliance on physical sensing elements such as Hall effect sensors to obtain the commutation information needed to determine the relative position of the machine's rotor and stator windings. Commutation angle corrections, if necessary, can be made. Rather, the method and apparatus of that invention involved sampling the DC bus current waveform and analyzing the samples to determine if there were an "in-phase", leading, or lagging commutation angle. If the commutation angle was determined to be leading or lagging as a result of the analysis, appropriate correction was made to adjust it to be "in-phase" or to a desired commutation angle for the particular set of machine operating conditions. The method recognized that as operating conditions changed, so would the desired "in-phase" relationship between the rotor and stator windings. Further, the invention allowed for commutation control throughout the entire range of machine operating speeds, rather than the limited speed range of control achievable with prior commutation controllers.

While generally effective, it has been found that in some instances, the commutation angle control analysis is effected by bus ripple, transients on the bus, and similar phenomena. The motor with which the commutation apparatus is used, typically includes a filter capacitor for filtering out ripple and transient effects on the bus line. However, at higher power applications, the capacitor may be unable to completely filter out these AC components. As a result, the current waveshape is distorted by the ripple and the transients and the desired level of control is lost. In applications where there is no line filter (capacitors, or inductors, or both), line AC components will be present on the bus.

In the sampling scheme disclosed in the 08/004411 application, now U.S. Pat. No. 5,420,492, the current envelope is sampled at two points during each commutation period. The sample values are then combined to produce a ratio value from which the commutation relationship between the rotor and stator phase windings is determined. Because of the envelope distortion produced by these AC and transient effects, or other system instabilities, the waveshape may be distorted such that the processed samples inaccurately reflect the phase relationship. The subsequent control applied to produce an "in phase" relationship for this condition now introduces a degree of instability into the motor/controller because the current waveshape (and the resultant ratios) vary widely from one commutation interval to the next. This situation could be corrected were it possible to fully eliminate the ripple and transient effects on the current envelope; or, compensate for their effects during processing of information obtained from waveshape sampling.

SUMMARY OF THE INVENTION

Among the several objects of the present invention may be noted the provision of a sensorless controller for use in commutation angle control of a dynamoelectric machine such as an electric motor of the type used in household appliances; the provision of such a sensorless commutation angle controller which effects commutation control of a poly-phase electric motor by sensing DC bus voltage and current and does not rely on Hall effect or other sensors for rotor and stator information; the provision of such a sensorless commutation angle controller which compensates for bus ripple or transients on the bus voltage or current waveform; the provision of such a sensorless commutation angle controller to therefore provide steady state stability and transient response; the provision of such a sensorless commutation angle controller to sense the ripple and transient effects and to use feedback control to cancel out their effect on commutation control; the provision of such a sensorless commutation angle controller having a mode controller which limits output power based upon the DC components of bus voltage and current; the provision of such a sensorless commutation angle controller to employ a control variable by which an error system of the controller is easily stabilized and the controller is not driven into oscillation; the provision of such sensorless commutation angle controller which has a zero steady-state error and good dynamic response; and, the provision of such a controller to use a control methodology involving a formula by which a feedback value is derived to cancel out the effects of the ripple and transients.

In accordance with the invention, generally stated, a dynamoelectric machine such as a BPM or SRM electric motor is supplied a DC bus current over respective supply and return lines. A PWM or six-step inverter uses the bus current to commutate the motor by systematically energizing and de-energizing phase windings of the motor with the current. The resultant bus current waveshape has characteristics that are a function of a commutation angle between a rotor of the machine and the machine windings. The waveshape also includes the effects of bus ripple or transients on the bus. A commutation controller samples the waveshape a number of times during each commutation interval to obtain commutation angle information from the sampled current waveshape. The controller uses a feedback circuit or algorithm to cancel out the effects of ripple and transients on the commutation control variable. Controller frequency and voltage correction inputs are provided to the inverter to adjust the commutation angle in response to the information obtained from the waveshape sampling. As part of the control methodology, the controller calculates a control variable which is a function of the commutation angle. This calculated control variable is then combined with a value which is a function of the ripple on the waveshape, and the machine's response to a transient. The result is now used to derive frequency and voltage control inputs supplied to the inverter. Other objects and features will be in part apparent and in part pointed out hereinafter.

BRIEF DESCRIPTION OF THE DRAWINGS

FIG. 2A is a representation of a brushless permanent magnet (BPM) motor, and FIG. 2B is a representation of a switched reluctance motor (SRM);

FIG. 9 is an illustration of the DC bus current waveform sampling of the present invention;

FIGS. 16A–16C represent DC bus waveform envelopes for "in-phase", lagging, and leading conditions respectively.

Corresponding reference characters indicate corresponding parts throughout the drawings.

DESCRIPTION OF PREFERRED EMBODIMENTS

Figure 1:
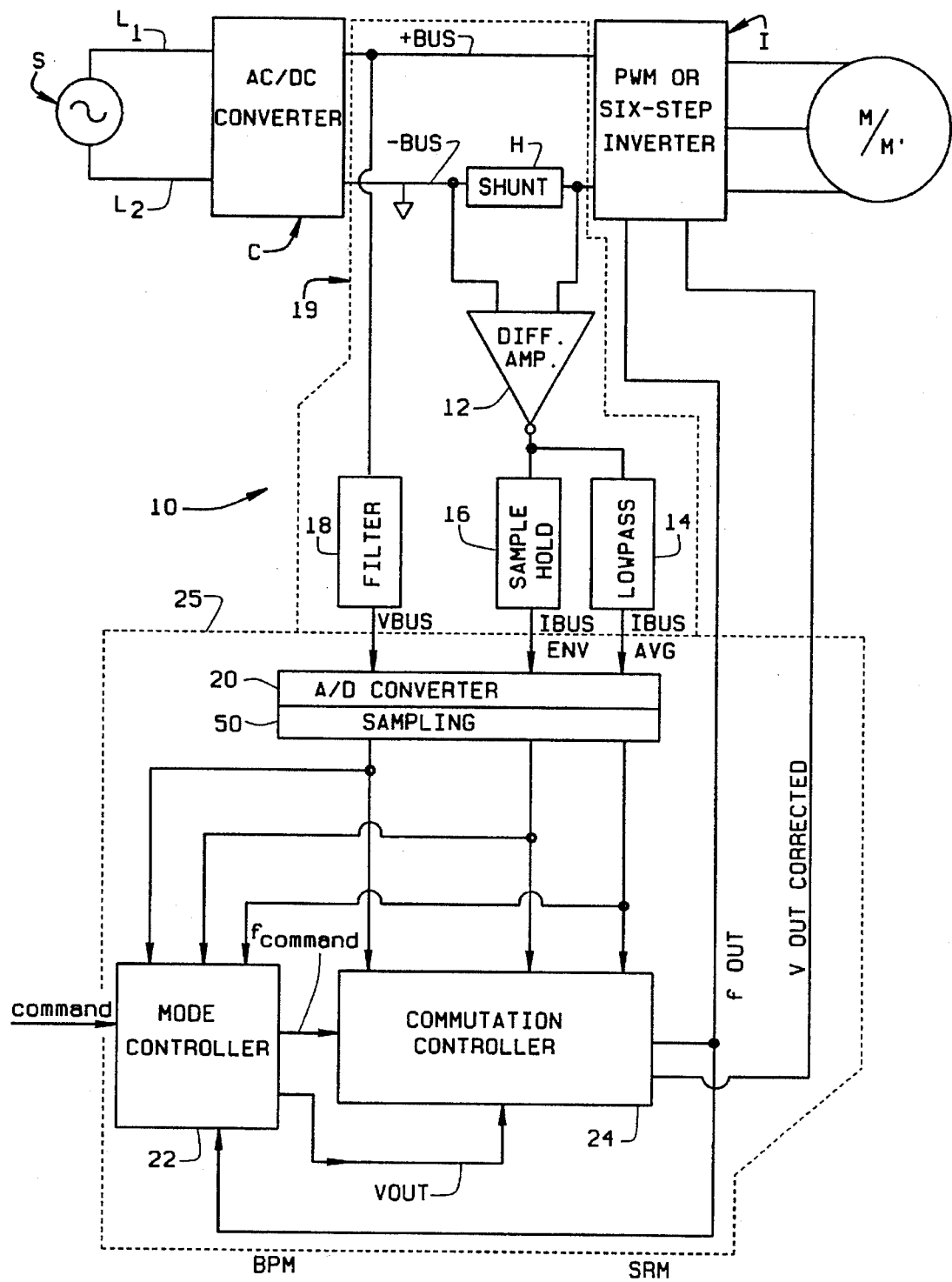
FIG. 1 is a system block diagram for a sensorless controller of the present invention.

Referring to the drawings, a dynamoelectric machine such as a poly-phase (three-phase) commutated, electric motor M is shown in FIG. 1. Motor M is, for example, a brushless permanent magnet (BPM) as shown in FIG. 2A, or a switched reluctance (SRM) motor M' as shown in FIG. 2B. Motor M is shown to be a three-phase motor having a rotor T and a stator assembly A. The stator assembly includes respective sets of windings W1–W3. Motor M' is similar in that it also a three-phase motor and includes a rotor T' and a stator assembly A'. The stator also has respective sets of windings W1'–W3'. Regardless of whether the motor is a BPM or SRM motor, the motor is of the type used in a household appliance (not shown).

AC power from a source S is applied to an AC-DC converter C over respective output and return supply lines L1, L2. The converter output is then supplied to a pulse-width modulated (PWM) inverter I. As is well-known in the art, inverter I could also be a six-step inverter. The output of the inverter is sequentially applied to the motor phases (the stator windings) in a controlled sequence by which a preferred relationship is maintained between the rotor T or T' of the motor, and the motor's stator windings W1–W3 or W1'–W3'. This relationship prevails for a given set of motor operating conditions (load, operating speed, etc.), and changes as the operating conditions change.

A sensorless controller 10 of the present invention is responsive to bus current information derived across a shunt H in the bus line between the converter and inverter. A sensorless controller is described in detail in co-pending U.S. patent application Ser. No. 08/004411 which is assigned to the same assignee as the present application. The teachings of this 08/004411 application are incorporated herein by reference. Briefly, operation of the controller described in the earlier application involved sampling, at two places, the DC bus current waveshape (see FIGS. 16A–16C) for the current supplied to the motor. Magnitude and ratio values were computed from the samples and used to determine if the motor commutation was "in phase" as shown in FIG. 16A, lagging as shown in FIG. 16B, or leading as shown in FIG. 16C. Based on this determination, an appropriate frequency and voltage correction input, if necessary, is made to an inverter through which current is supplied to the motor windings.

It will be understood that DC bus current on lines L1, L2 is subject to AC ripple, and bus transients. When these occur, they are superimposed on the current waveshape. The resultant waveshape which is sensed by controller 10 is a composite, distorted waveshape. When this distorted waveshape is processed by the controller, the result may be an incorrect interpretation of the waveform. Consequently, the controller output to the inverter may not necessarily drive the motor toward an "n-phase" condition. Further, since these AC effects will distort the current waveshape from one commutation interval to the next, the correction signals supplied to the inverter may also produce an erratic result. The resulting motor operation can therefore be unstable and inefficient.

Controller 10 of the present invention operates such that the bus current waveshape developed across shunt H is amplified by an amplifier 12, and supplied to both a low pass filter 14 and a sample-and-hold circuit 16. The output of the filter is an $I_{bus}$avg. signal; while, that from the sample and hold circuit is an $I_{bus}$env. signal. Additionally, a $V_{bus}$ signal is developed using a filter 18 connected across the DC bus lines L1, L2 extending between the converter and inverter. The shunt H, amplifier 12, sample-and-hold circuit 16, and respective filters 14, and 18, all comprise a means 19 for sensing the DC bus current waveshape.

Figure 3:
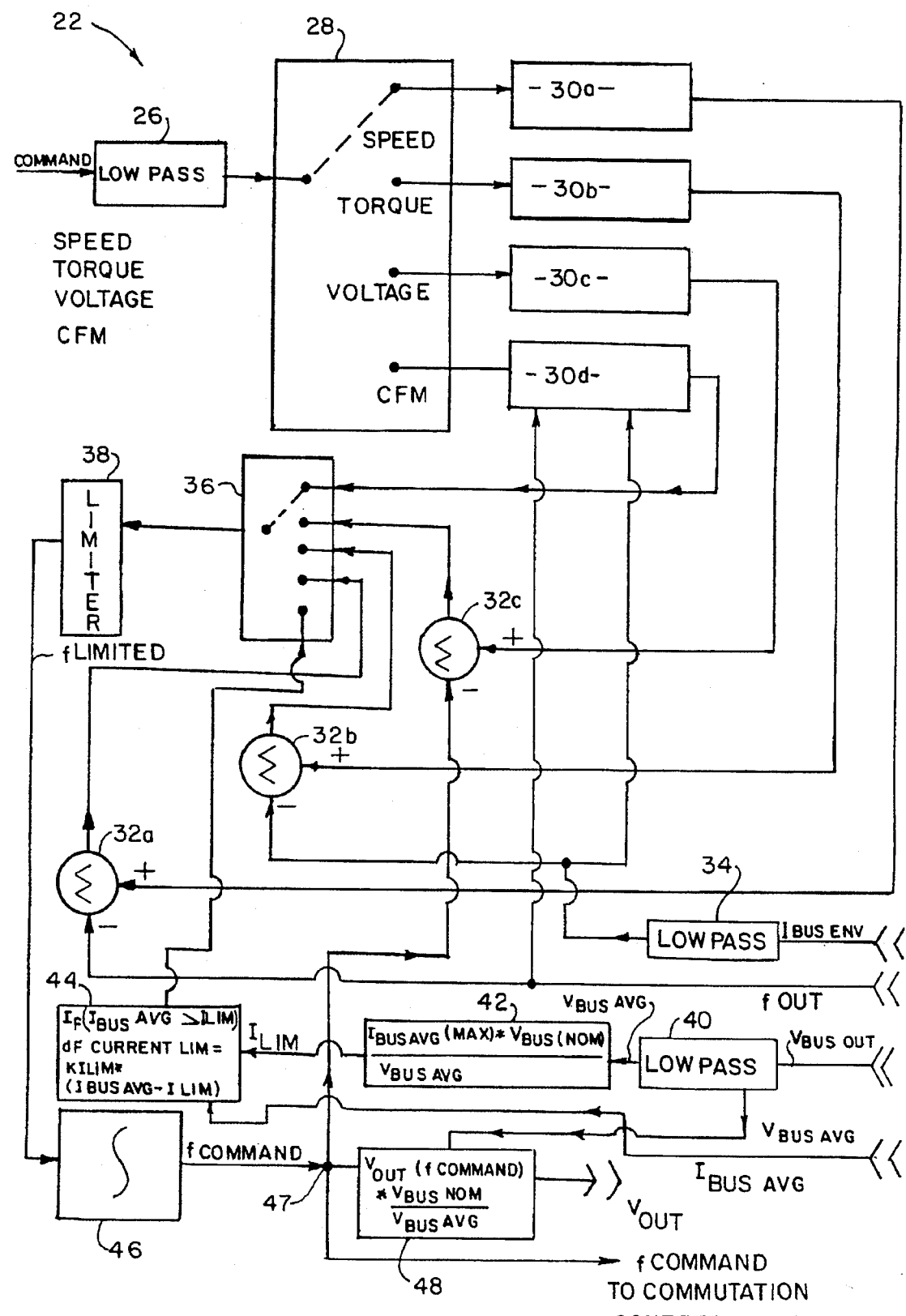
FIG. 3 is a block diagram of a mode controller portion of a waveform processor of the controller.

All three signals are applied to an analog-to-digital (A/D) converter 20. The digital output signals from the A/D converter are applied in parallel to both a mode controller 22 and a commutation controller 24. The mode controller is described in more detail with respect to FIG. 3. Various embodiments of the commutation controller are described in more detail with respect to FIGS. 4–8. The A/D converter, mode controller, and commutation all comprise a means 25 for sampling the DC bus current waveform, processing the waveform information to correct for the effects of ripple and transients, determine from the corrected waveshape information whether the commutation is "in-phase", lagging, or leading, and provide appropriate frequency and voltage inputs to inverter I. The inverter is responsive to the inputs from the commutation controller to sequentially shift current from one set of motor stator phase windings to the next, the timing being such as to bring or maintain the rotor "in phase" with the stator windings.

Mode controller 22 receives command signals from an appliance control unit (not shown). These signals tell the mode controller 10 the current operating mode of the appliance and when the appliance has shifted from one operating mode to another. These signals further indicate to the mode controller various performance parameters associated with the particular operating mode. These parameters include, for example, motor speed and torque, and the voltage applied to the motor. If the appliance is a washing machine, other information relating to operation of the appliance may include the volume of water in cubic feet/ minute (cfm) passing through the machine. These signals are supplied through a low pass filter 26 to a switching module 28 within the controller. The module may incorporate an appropriate algorithm. Switch 28 is a multiplexed switch whereby the respective input signals for various performance parameters such as motor speed and torque are directed to associated modules 30a–30d. Each module employs an algorithm with the input signal, the algorithm representing motor operating characteristics for a particular parameter.

The outputs of modules 30a–30c are supplied to respective summers 32a–32c. Each module 30 output is applied to the non-inverting input of its respective summer. The frequency output signal from commutation controller 24 to inverter I is fed to mode controller 22. This signal is supplied to the inverting input of summer 32a. The converted value for $I_{bus}$env. output from A/D converter 20 is commonly supplied to the inverting input of summer 32b. The $I_{bus}$env. signal is supplied to the mode controller through a low pass filter 34. The output of each of these summers, and summer 32c is supplied as an individual input to a switching module 36. The signals from low pass filter 34 and the signal $f_{out}$ are supplied directly to module 30d. Module 30d processes the filtered signal $I_{bus}$ env. and the signal $f_{out}$, using the appropriate algorithm, to provide the proper input to switching module 36.

Switching module 36, like module 28 is a multiplexed switch. The selected input to the module is provided as an output to a limiter 38. The limiter functions to restrict the value of any of the selected parameters to a defined range of values. For example, limiter 38 may be used to limit the rate of motor acceleration. If the value of a selected parameter is within the range, the output of the limiter is that value. If the parameter value exceeds either the upper or lower bound for the parameter, the limiter output is that bound value.

The switching module has, as a fifth input, a value representing the differential of frequency of the DC bus current limit. The $V_{bus}$ output from A/D converter 20 is supplied through a low pass filter 40 to a processing module 42. The output from the filter is a signal $V_{bus}$avg. Module 42 performs a scaling function and therefore uses this value as a divisor for a value representing the maximum average bus current combined with a nominal bus voltage value. The output from module 42 is a value representing a current limit. This value is supplied to a logic module 44 which determines the magnitude of the current limit signal vis-a-vis the average bus current value ($I_{bus}$avg.). For this purpose, module 44 receives a second input which is the average bus current signal $I_{bus}$avg. from A/D converter 20. The result of the comparison generates the differential signal supplied to switching module 36.

Limiter module 38 provides a limited differential frequency signal ($f_{limited}$) to an integrator 46. Integrator 46, in turn, provides as an output a frequency command signal ($f_{command}$). The frequency command signal is supplied to a junction point 47. From the junction point, the signal is supplied both to the inverting input of summer 32c, and to a mode controller output module 48. It is also directly supplied to commutation controller 24. Module 48 has, as a second input, an average bus voltage signal $V_{bus}$avg. from input filter 40. The module combines a function of the frequency command signal ($V_f$ command, (V/Hz)) with a value obtained by dividing a nominal bus voltage value by the average bus voltage value. The product of these operations is a voltage output signal (Vout) which is supplied from module 48 to commutation controller 24.

In the 08/004411 application, now U.S. Pat. No. 5,420, 492, referred to above, the controller described therein operates in part by taking two samples of the DC bus current waveshape during each commutation interval. As noted above, it has been found that the effects of AC ripple and line transients distort the waveshape so the samples, when processed, may not accurately represent the commutation angle. To avoid this problem, the improved controller of the present invention first senses the DC bus current waveform three times during each interval instead of twice. As shown in FIG. 9, a sample 1b is taken at a point approximately one-third the length of the interval. A second sample 1m is taken at a point approximately two-thirds the length of the interval. The final sample 1e is taken at the end of the interval. It will be understood that the exact times within the interval when each of the three samples is taken may vary. What is important is that one of the samples be taken toward the beginning of the interval, a second sample at an intermediate point in the interval, and the third sample toward the end of the interval. Thus, a first sample can be taken at 0.33t where t is the commutation interval, the second at 0.66t, and the third at 1.00t. It is not necessarily important that the samples be taken at these times. It is however important that the time period between when the first and second samples are taken, and between when the second and third samples are taken, be generally equal. Thus, instead of the samples being taken at 0.33t, 0.66t, and 1.00t, the samples could also be taken at 0.30t, 0.60t, and 0.90t, for example. Also, it will be understood that the samples represent digital values selected from the digital data stream produced by A/D converter 20. In this regard, the A/D converter has an associated sampling module 50 which takes the samples from the converted data stream. This allows the output data stream to both the mode controller and commutation controller section of processor 25 to be digitized, sampled data derived from the input to the A/D converter.

Figure 4:
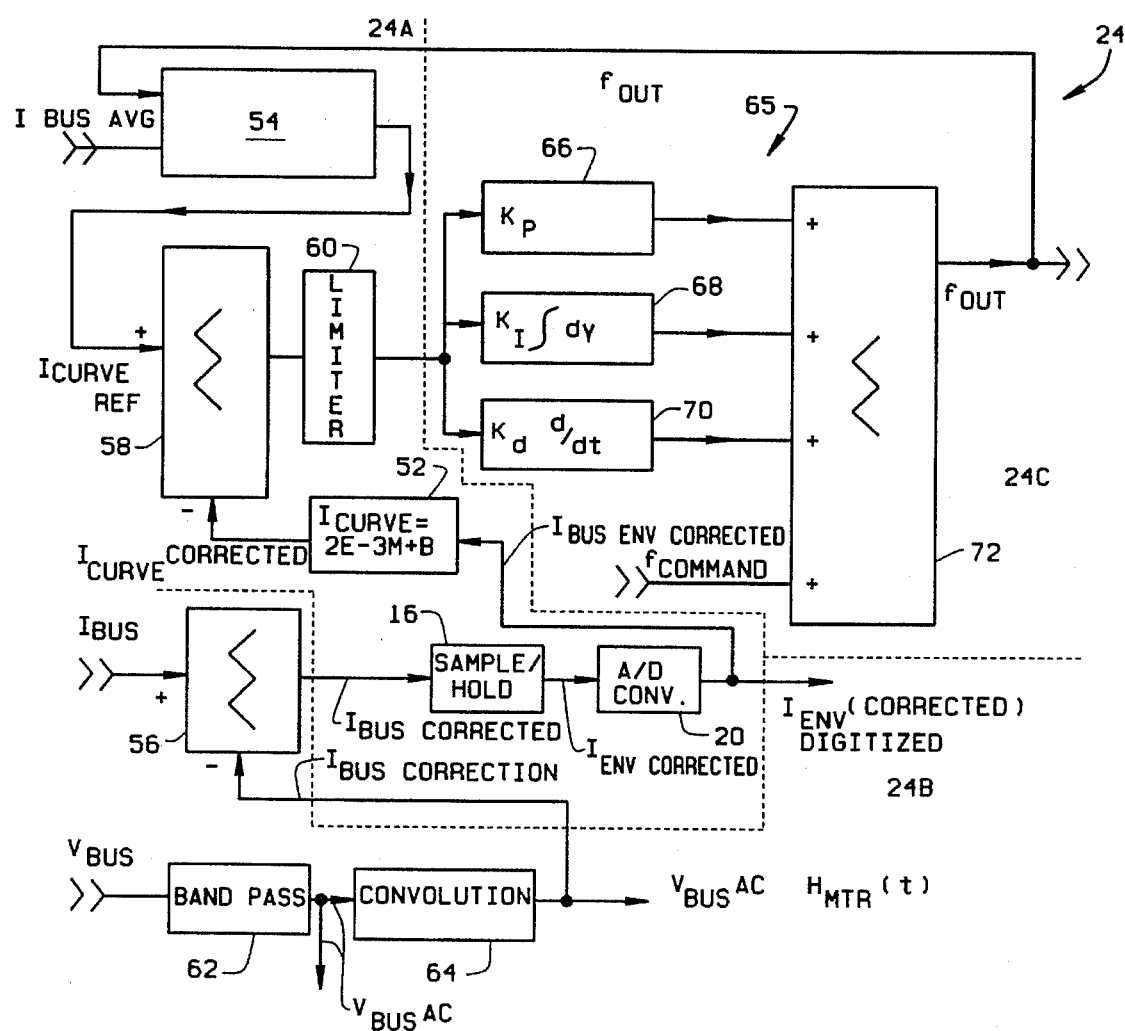
FIG. 4 is a block diagram of a commutation controller portion of the waveform processor.

Referring to FIG. 4, a first embodiment of commutation controller 24 includes both a commutation angle control section 24A, and a ripple rejection section 24B. Section 24A corrects for errors in commutation angle using samples of bus current $I_{bus}$corrected. This is achieved through response of the controller to fluctuations in a control variable ($I_{curve}$ corrected). Response to these fluctuations is important not only to help achieve proper commutation, but also to keep the motor from being driven into oscillations. The reference point $I_{curve}$ ref. is also adjusted by module 54 as a function of average bus current, $I_{bus}$avg. and an inverter output frequency, $f_{out}$. This adjustment of the operating point allows the controller to vary the desired commutation angle to best accommodate the load, motor, and system efficiency needs.

Section 24B acts to remove the effects of the AC bus ripple component on the bus current waveform. The output from these two sections are combined and the result is applied to a control means 24C. This control means is responsive to the combined input from sections 24A, 24B to develop an output signal which represents a frequency correction input to inverter I. This input causes the inverter to adjust the commutation interval to drive the system toward an "in-phase" condition.

To estimate rotor position as a function of bus current, the $I_{bus}$ signal from the shunt H, of FIG. 1 is applied to the non-inverting input of a summing element 56 to which the current correction signal $I_{bus}$ correction is also applied. The current correction signal is derived by first extracting the AC component of the bus voltage with a bandpass filter 62 and then performing a convolution of the AC component of the bus voltage, $V_{bus}$AC with the small signal impulse response Hmotor (t) of the motor. Convolution is performed by a convolution element 64, and is essentially passing the AC component of the bus voltage through a filter with the same response as the motor. The output of the summing element 56 is then passed to the sample and hold module 16 and A/D converter 20 previously mentioned. After the A/D conversion at converter 20, the resultant digital data is a representation of bus current corrected for bus ripple and transient effects. The A/D converter output is supplied to sample processing module 52.

Module 52 operates on the sampled waveform values lb, lm, and le. These have now been combined using the following equation:

$$I_{curve} = 2E - 3M + B,$$

where E represents the le value taken at the end of the interval, M the lm value taken in the middle, and B the lb value taken at the beginning. $I_{curve}$ represents a control variable and the formula is based on an analysis of the different sample values and one way of combining them. It will be understood that the sample values can be combined in accordance with other formulas. In FIG. 4, $I_{curve} = I_{curve}$ corrected because correction is carried out before digitizing of the waveform.

Figure 10:
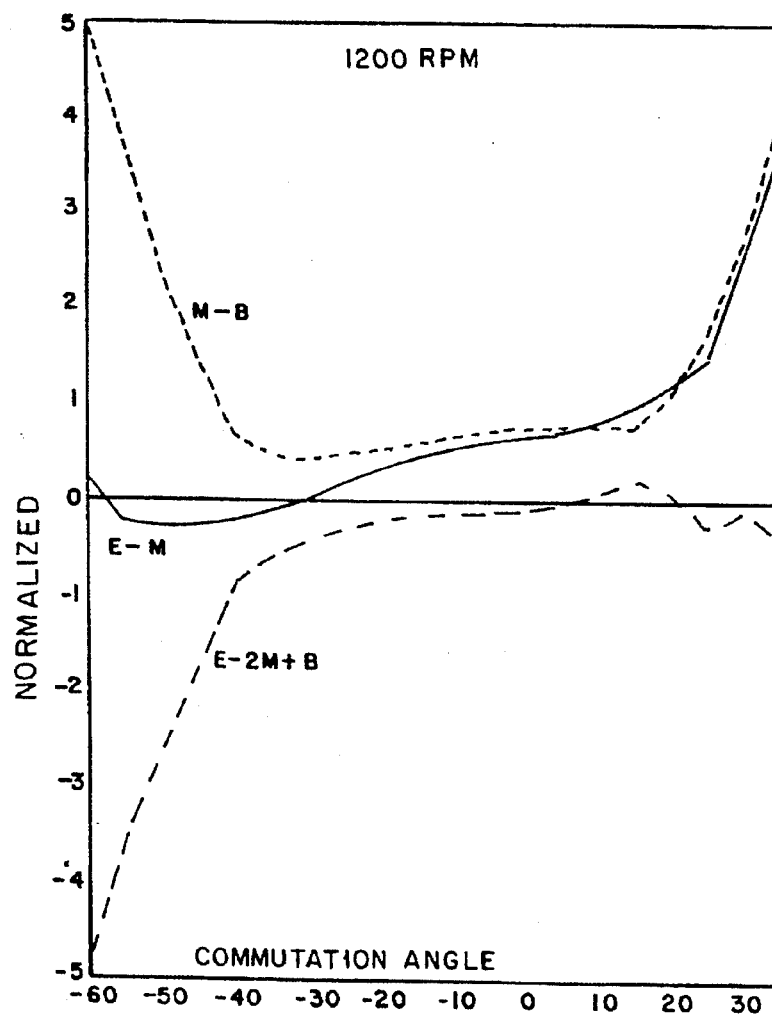
FIG. 10 is a graphic representation of curves representing possible feedback control equations used to describe commutation angle as a functions of sampled bus current.

Referring to FIG. 10, a series of curves are presented representing different trial combinations of sample values. A first curve M-B is shown to follow a general U-shape. A second curve E-M is shown to be generally flat over a wide range of commutation angles, but to then rise sharply as the commutation angle increases past zero. Conversely, a third curve representing the combination E−2M+B rises steeply for commutation angles tending toward zero, but then becomes generally flat.

Figure 11:
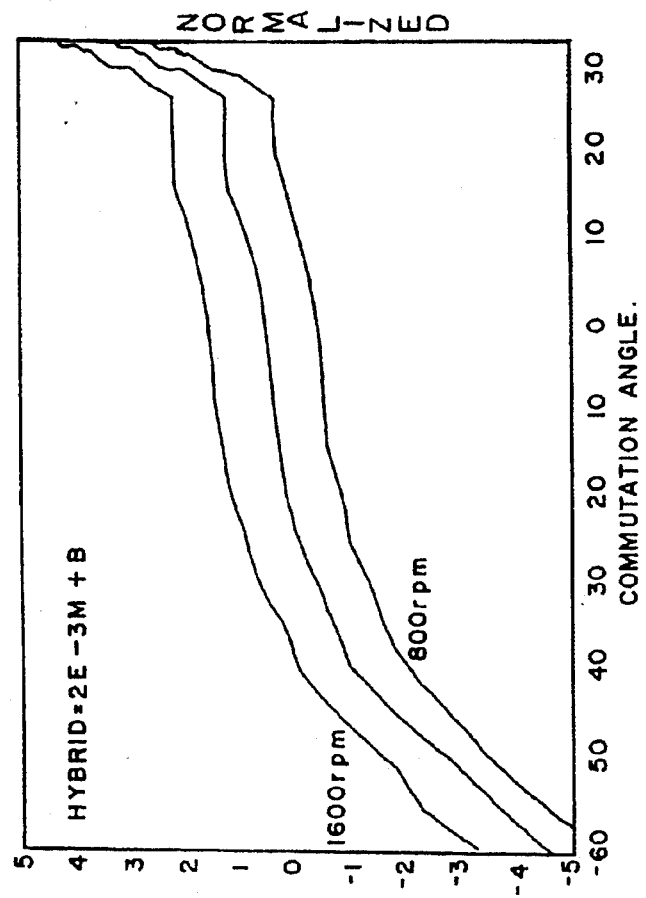
FIG. 11 is a graphic representation of preferred feedback control curves used in the commutation controller, the curves being for different motor speeds.

None of the three curves presented provide an appropriate control variable which should have a general linear relationship over a wide range of commutation values. However, it will be noticed that a combination of the two curves represented by E-M and E−2M+B tends to provide the desired linearity. Accordingly, as shown in FIG. 11, a curve expressed by the above formula (which equals the combination of the two curves) provides the desired linearity. In FIG. 11, three curves are presented. One is for a motor operating at 800 rpm, and the second for a motor operating at 1600 rpm. An intermediate curve is also shown and generally parallels the other two curves. In all three curves, the intermediate portion of the curves is generally linear. Only at the ends of the range of commutation angles do the curves rise or fall off steeply.

Figure 13:
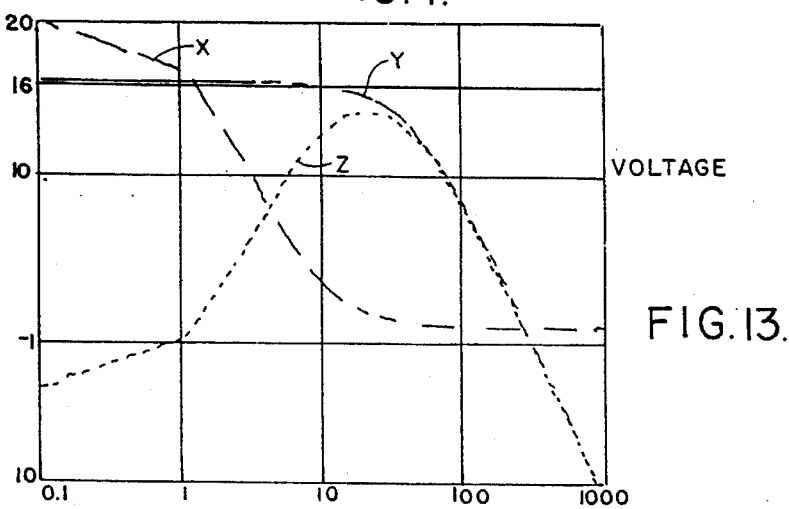
FIG. 13 is a graph of the frequency response for the motor voltage, compensation, and error.
Figure 14:
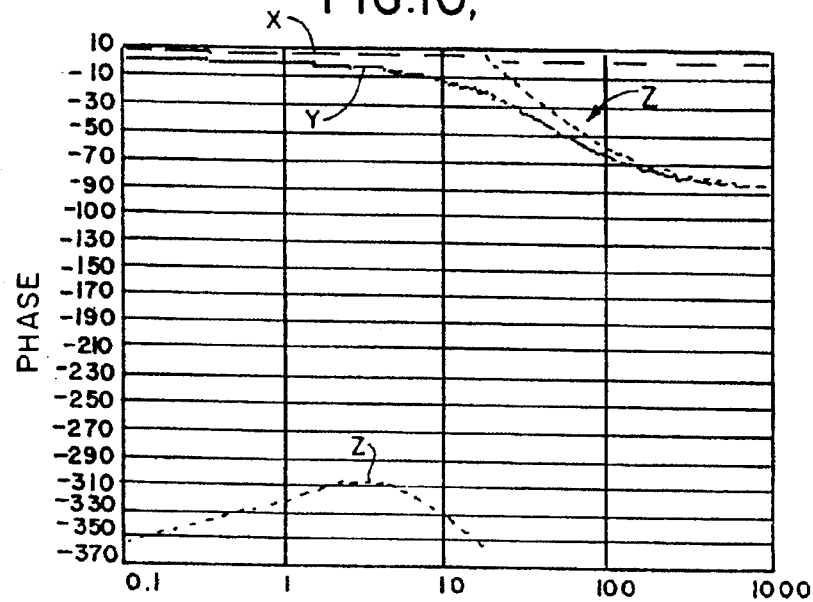
FIG. 14 is a graph similar to that of FIG. 13 but for phase.
Figure 12:
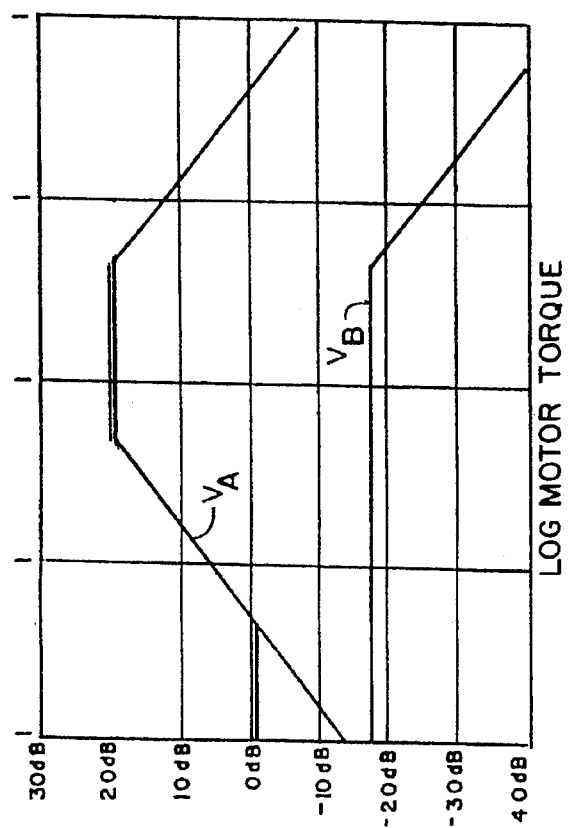
FIG. 12 is a graphic illustration of a first approximation for a filter used in the controller.

In FIG. 12, $V_A$ is an example of a straight line approximation Bode amplitude plot used to "bandpass" the AC components of the bus voltage. As such, it represents a scaled, high frequency simulation of the motor's frequency response. $V_B$ is an example of the straight line approximation Bode plot of the voltage sensed at the shunt H of FIG. 1; and as such, represents the high frequency attenuation a BPM typically provides. FIG. 13 illustrates the actual amplitude/frequency response of a motor M (curve Y), and the actual amplitude/frequency response of the amplifier A2 shown in FIG. 15 (curve Z). The curve X represents the difference between the two curves Y and Z. As can be seen from curve X, the error becomes very small for frequencies of 120 Hz and higher. FIG. 14 is a graph similar to FIG. 13 except that the curves are plotted for phase rather than amplitude.

Again with respect to FIG. 4, the $I_{bus}$avg. signal is supplied to a control variable reference module 54. Module 54 supplies the $I_{curve}$ref. output signal which is a function of both the $I_{bus}$avg. input, and a frequency output signal $f_{out}$ which is fed back to module 54 from the output of control means 24C. Module 52 combines the B, M, and E sample values of the $I_{bus}$env. corrected input in accordance with the above described formula. This results in an output $I_{curve}$ corrected.

The output from module 52 is the control variable $I_{curve}$ corrected, this correction being for bus ripple. This output is now applied to the inverting input of a summer 58. The $I_{curve}$ref. output from module 54 is supplied to the non-inverting input of the summer. Now, the output from the summer represents the DC bus current waveform corrected for both AC ripple and bus transient effects. This signal is provided to a limiter 60 which implements the high end and low end limiting discussed with respect to FIG. 11. That is, if the corrected output signal from module 60 is outside the natural linearity range, at either end of the relevant curve shown in FIG. 11, limiter 60 acts to limit the value to maximum or minimum allowed value.

As noted, section 24B of the commutation controller is supplied the $V_{bus}$ input signal. This signal will contain any AC ripple present on the DC bus. The $V_{bus}$ input is first supplied to the bandpass filter 62. After filtering, it is supplied to the module 64 where it is combined with a value $H_{motor}(t)$. $H_{motor}(t)$ represents motor M or M's small signal impulse response. These two value are combined by performing a convolution of one with the other. As a result, a signal $I_{bus}$correction is produced. This signal is applied to the inverting or correction input of summer 56 for summing with the $I_{bus}$ signal developed at shunt H.

The output signal from limiter 60 represents, as noted, an error signal of the DC bus current waveform corrected for ripple and transient effects minus the reference current signal $I_{curve}$ ref. This signal is supplied to a PID controller 65 comprising respective modules 66, 68, 70. Controller 65 is responsive to the corrected error signal to determine a commutation interval which will produce an "in phase" commutation angle for the particular set of motor operating conditions. This interval relates to the inverter I operating frequency. Summer 72 supplies an output signal $f_{out}$ to inverter I to drive the motor. This $f_{out}$ signal is also fed back as an input to module 54.

The output signal from limiter 60 is simultaneously supplied to a proportional controller 66, an integrator 68, and a differentiator 70. Each unit has an associated gain constant $K_p$, $K_i$, and $K_d$ respectively. The values of these constants are function of the design and operating characteristics of motor M or M'. Each unit supplies a separate output to a non-inverting input of a summing unit 72. Further, the $f_{command}$ output signal from integrator 46 (see FIG. 3) is also supplied as an input to the summing unit. The summing unit combines the frequency command input, which represents the nominal operating frequency of the inverter for the motor's current set of operating conditions with the inputs representing current DC bus current waveshape. These latter represent the motor's actual operation. The resultant output $f_{out}$ includes any correction to the $f_{command}$ signal which will drive the motor towards an "in phase" condition. If the motor is currently operating "in phase", there is no correction made to the $f_{command}$ input.

Figure 5:
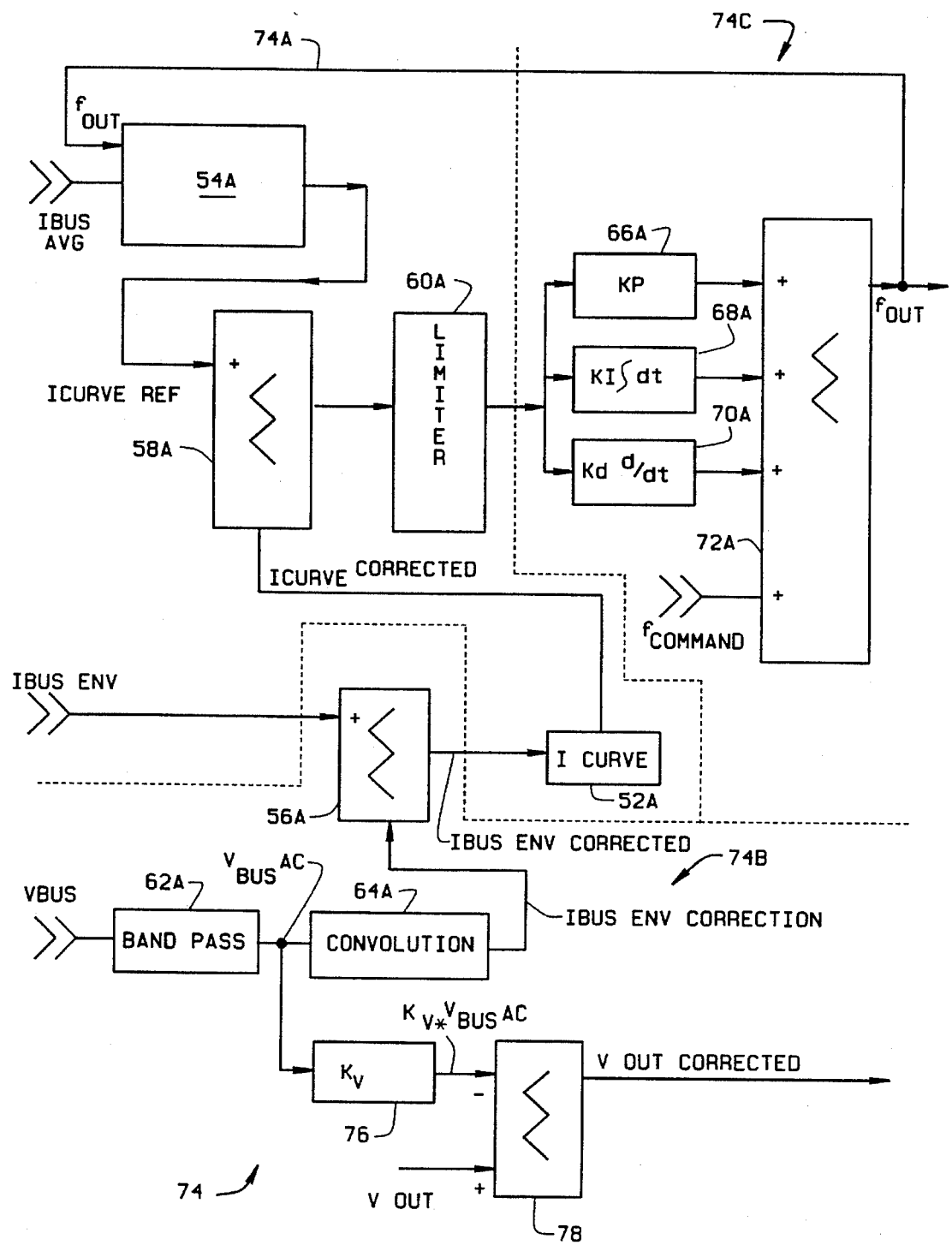
FIG. 5 is a block diagram of a second embodiment of the commutation controller.

Referring to FIG. 5, a preferred embodiment of the commutation controller is designated generally 74A. As is seen in the FIG., this alternate embodiment is similar to that described with respect to FIG. 4 except that performance of controller 74A is enhanced by correcting both frequency and voltage. The controller of FIG. 5 may, however, be fed digital data by A/D converter 20 whereas the $V_{bus}$ and $I_{bus}$ inputs of the embodiment of FIG. 4 were analog signals.

Accordingly, similar components are indicated by the suffix "A" and function in the same manner as described above. Commutation controller 74A differs from controller 24 in that the $V_{bus}$ AC output from bandpass filter 62A is supplied to a gain module 76, in addition to module 64A. Module 76 scales the AC component of the $V_{bus}$ input to properly cancel the actual AC voltage on the bus by varying the output voltage about the average output voltage represented by $V_{out}$. The output from module 76 is supplied to the inverting input of a summer 78. A second input to summer 78 is the $V_{out}$ signal from mode controller 22 output module 48. In the previous embodiment of the apparatus, the output from module 48 was supplied directly to inverter I. Summer 78 combines the output from module 76, representing a properly scaled representation of bus ripple ($K_v V_{bus}$ AC) with the $V_{out}$ input from the mode controller to produce an output $V_{out}$ corrected. Now, this signal is supplied to the inverter as its voltage control input.

Figure 6:
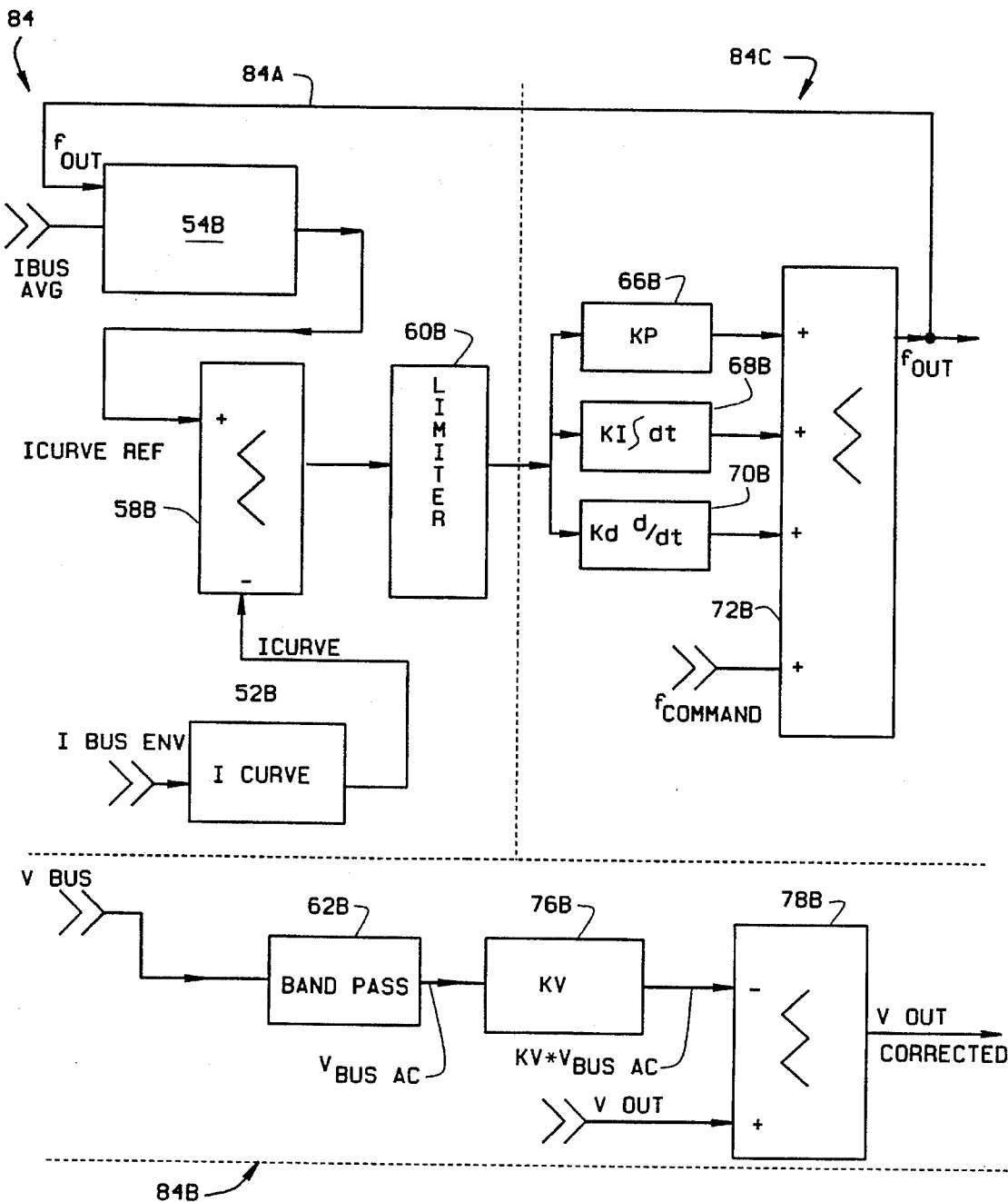
FIG. 6 is a block diagram of a third embodiment of the commutation controller.

FIG. 6 illustrates yet another embodiment of the commutation controller. This embodiment is designated 84. Operation of commutation controller 24B is generally similar to commutation controller 24 previously described. All components similar to those discussed above are indicated by a suffix "B". Controller 84 differs from the previously described controller embodiments in that the output from module 52 representing the control variable $I_{curve}$ is not combined with an output from a ripple rejection section of the controller (i.e., 56, 62, 64 in FIG. 4, or 56A, 62A, 64A in FIG. 5). Thus, whereas the output from module 52A was combined with that of module 64A at summer 56A in FIG. 5; or, the $I_{bus}$ signal was combined with the output of module 64 at summer 56 in FIG. 4, the output of module 52B is directly supplied to an inverting input of a summer 58B. The other input to summer 58B is still the $I_{curve}$ ref. output from module 54B. As with controller 24, the output of summer 58B is supplied to a limiter 60B and thence to the control means section 84C of the controller.

The module 64 in which the convolution is performed between the $V_{bus}$ AC signal input to the ripple rejection section 84B of the controller, and the small signal impulse response $H_{motor}(t)$ of the motor is eliminated from this embodiment. Rather, the $V_{bus}$ input is supplied to the bandpass filter 62B and then to a gain module 76B. As in controller 74, the gain module output is combined with the voltage output signal $V_{out}$ from the mode controller to produce the $V_{out}$ corrected signal supplied to inverter I.

Figure 7:
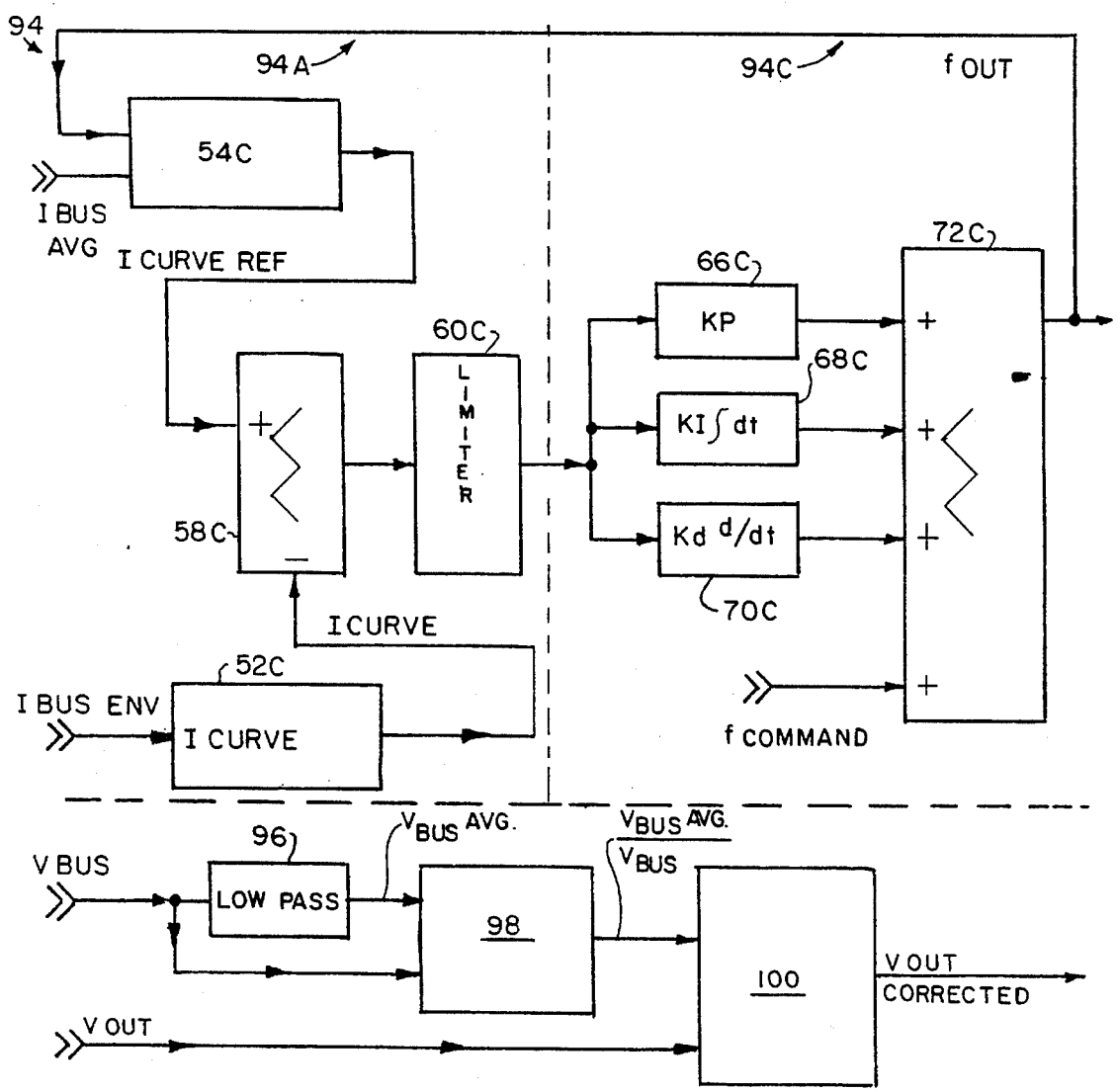
FIG. 7 is a block diagram of an fourth embodiment of the commutation controller.

Referring to FIG. 7, a fourth embodiment of the controller section is indicated generally 94, all components similar to those previously described are indicated using the suffix "C". Controller 94 differs significantly from the previously described embodiments in the design and operation of the ripple rejector portion 94B of the controller. Sections 94A and 94C of controller 94 work the same as previously described. In section 94B, the $V_{bus}$ input signal to the controller is processed by a lowpass filter 96 to produce a $V_{bus}$ avg. signal output. This signal, in turn, is supplied as an input to a divider module 98. Module 98 has as a second input, the $V_{bus}$ input to section 94B. In the divider module, the $V_{bus}$ input is divided into the $V_{bus}$ avg. signal to produce an output $V_{bus}$ avg./Vbus. This new signal is supplied to a multiplier module 100. The Vout signal output from mode controller 22 is also provided as an input to module 100. Multiplier module 100 combines the two inputs to produce the Vout corrected signal supplied as an input to inverter I.

Figure 8:
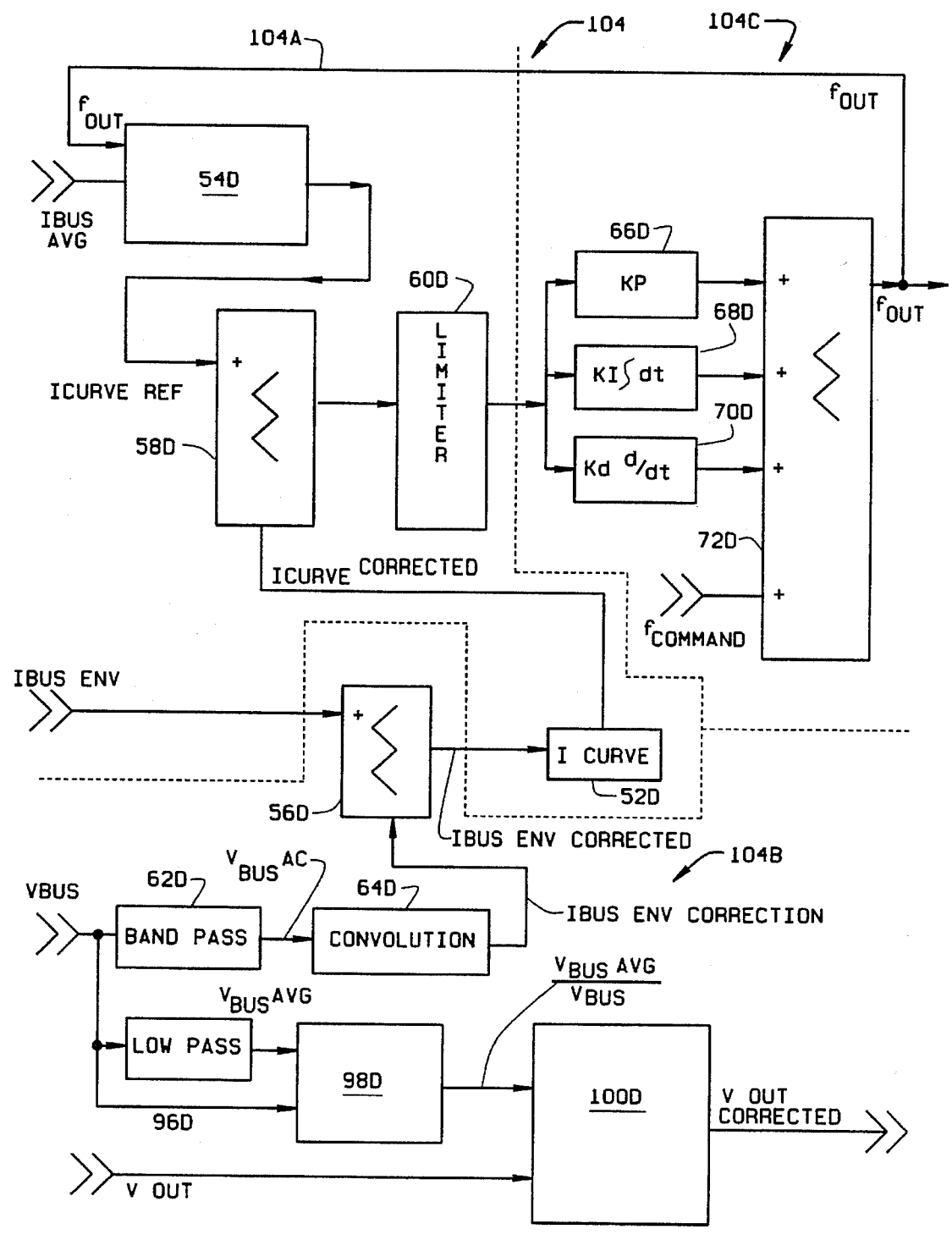
FIG. 8 is a block diagram of a fifth embodiment of the commutation controller.

In FIG. 8, yet another embodiment of the commutation controller is designated 104. For this embodiment, all components similar to those previously described have the suffix "D". Ripple rejection section 104B of commutation controller 104 now functons as follows:

First, section 104B is supplied the $V_{bus}$ input signal which reflects any AC ripple present on the DC bus. The $V_{bus}$ input is supplied to the bandpass filter 62D. After filtering, it is supplied to processor module 64D where it is combined with the value $H_{motor}(t)$ representing the motor's small signal impulse response. These two values are then combined by performing the convolution of one with the other as noted with respect to embodiments 24 and 74 of the commutation controller. The resultant signal $I_{bus}$ env. correction is produced. As with embodiment 74, this signal is applied to the inverting input of a summer 56D for summing with the $I_{bus}$ env. signal from module 50 (see FIG. 1) to produce the $I_{bus}$ env. corrected signal. The $I_{bus}$ env. corrected signal is the input to module 52D which calculates, the $I_{curve}$ corrected signal from the three samples, Ib, Im, Ie taken from the $I_{bus}$ env. corrected signal.

The $V_{bus}$ input signal to the bandpass filter 62D is simultaneously supplied to the lowpass filter 96D. The output from the lowpass filter is the signal $V_{bus}$ avg. This signal is supplied to divider module 98D. The $V_{bus}$ input to ripple rejection section 104B is provided to module 98D as a divisor. This signal, when divided into the $V_{bus}$ avg. signal produces the output $V_{bus}$ avg./Vbus. The Vbusavg./Vbus signal is supplied to multiplier module 100D. Again, the Vout signal output from mode controller 22 is provided as an input to module 100D. Module 100 combines the two inputs to produce the Vout corrected signal supplied as an input to inverter I.

As a result, commutation controller 104 is a hybrid controller in that the ripple rejector section of the controller operates on the $V_{bus}$ input in both of the two ways previously described in the other embodiments of the commutation controller. This hybrid combination thus includes an enhanced degree of control of both the frequency output and corrected voltage signals supplied to the inverter to bring motor commutation "in phase".

Operation of the commutation controller in any of the above described embodiments provides a high level of control so to provide stable motor operation even in the presence of AC bus ripple and power line transients. Use of the control variable for transient compensation and the rejection of any AC ripple component is readily achieved using any of the embodiments to achieve the desired "in phase" commutation. "In phase" commutation for any given set of motor operating conditions provides the most efficient level of operation.

Figure 15:
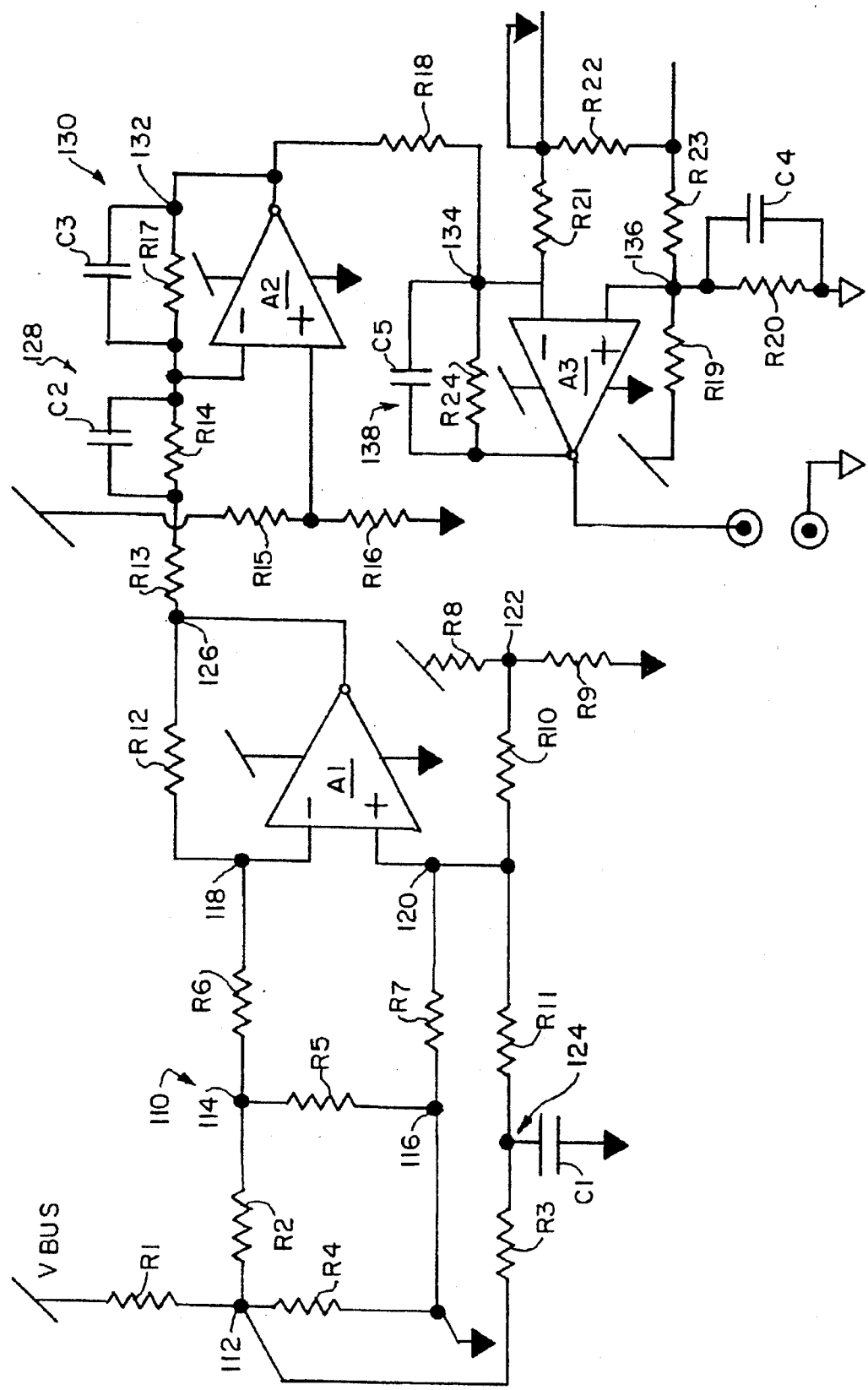
FIG. 15 is a schematic diagram of a circuit for correcting the bus current feedback for AC ripple and transients on the bus.

In each of the above described embodiments of the commutation controller, and the mode controller, the various components described can be implemented using integrated circuits and appropriately programmed digital elements. Referring to FIG. 15, the implementation of the ripple rejector portion of the commutation controller can also be achieved with discrete analog components. This embodiment of the ripple rejector is indicated generally 24E.

The circuit of the ripple rejector includes three operational amplifiers (op-amp) A1–A3. The first op-amp A1 is responsive to the $V_{bus}$ input to the ripple rejector to delete the DC component of the input and pass along the AC portion of the signal with a DC bias. The second op-amp A2 bandpass filters the output from op-amp A1 and combines the output of op-amp A1 with the small signal impulse response of the motor. This is the convolution function previously discussed. Lastly, the third op-amp A3 senses the bus current and subtracts from the signal the "estimated" impact of the AC ripple.

In more detail, the $V_{bus}$ input signal is supplied to the inverting input of op-amp A1. The signal is provided through an input resistor R1 to a voltage divider network 110. The network includes a node 112 to which resistors R2 and R3, and a potentiometer or fixed resistance R4 are connected in parallel. The other side of resistor R2 is connected to a node 114. Also connected to this common point are one side of resistors R5 and R6. The other side of resistor R5 is connected to a node 116 which is tied to common. The other side of potentiometer or fixed resistor R4 is also connected to node 116. Resistor R6 is connected to a node 118 which connects to the inverting input of op-amp A1. A resistor R7 has one side connected to node 116 and its other side to a node 120. The non-inverting input of op-amp A1 also connects to this common point.

A DC reference voltage is produced by applying a DC voltage across a voltage divider comprising resistors R8 and R9. The other side of this resistor is connected to common. A resistor R10 has one end connected to a node 122 between resistors R8 and R9. Resistor R10 also connects to node 120 for the reference DC voltage to be provided to the op-amp. Resistor R3 extends between node 112 and a node 124. Also connected to this node are a resistor R11 and a capacitor C1. The other side of the capacitor connects to common; while, the other end of resistor R11 also connects to node 120. The output of the op-amp is connected to a node 126. A feedback resistor R12 connects between nodes 118 and 126 to apply the output of the op-amp back to its inverting input.

When the $V_{bus}$ signal is applied to ripple rejector 24E, the DC component of the signal is eliminated by the resistor network 110, capacitor C1 circuit. The DC bias on which the AC component of the input is imposed is provided by the reference voltage input to the non-inverting input of the op-amp.

The op-amp A1 output at node 126 is applied to RC circuit 128 through a resistor R13. RC circuit 128 comprises a parallel connected resistor R14 and capacitor C2. The output of the RC circuit is applied to the inverting input of op-amp A2. A DC reference voltage is developed across a voltage divider comprising resistors R15 and R16. This voltage is applied to the non-inverting input of the op-amp. The output of the op-amp at node 132 is applied back to its inverting input through another RC circuit 130. This circuit comprises parallel connected resistor R 17 and capacitor C3. These RC circuits produce the bandpass filtering discussed with respect to FIG. 4 and the impulse response of the motor, and op-amp A2 performs the bandpass filtering and convolution between the motor's impulse response and the AC component of the bus voltage. The output of the op-amp thus reflects the impact of the AC component of the DC bus current on the sampled waveform values.

The output of op-amp A2 is connected to a node 132. A resistor R18 is connected between this node and a node 134. Node 134 connects to the inverting input of op-amp A3. A DC reference voltage is supplied to the non-inverting input to the op-amp. This voltage is developed across a resistor R19 and a resistor R20. These are commonly connected at a node 136. A capacitor C4 is connected in parallel with resistor R20, the other side of which is connected to common. A resistor R21 is connected between the inverting input of op-amp A3 and common. A shunt resistor R22 is commonly connected to ground with resistor R21. The other side of resistor R22 is connected to a resistor R23, the other side of which is connected to node 136.

The shunt resistor R22 is comparable to the shunt H shown in FIG. 1 and is used to sense the instantaneous DC bus current. As a result, op-amp A3 is able to subtract the AC ripple content of the bus current (as developed by op-amp A2) from the bus current. The output of op-amp A3 is fed back to its inverting input through an RC circuit 138 comprising a resistor R24 and its parallel connected capacitor C5. The output of the op-amp is also the output of the ripple rejector circuit and is supplied as an input to sample and hold module 16 of the commutation controller (see FIG. 1).

What has been described is a sensorless controller for use in commutation angle control of an electric motor such as is used in household appliances. The controller is an improvement over that described in patent application 08/004411. As with the earlier controller, the controller of the present invention effects commutation control without reliance on Hall effect or other sensors for rotor and stator information. The improved controller, as described above, compensates for bus ripple or transients which are present on the bus voltage waveform. By doing so, it provides both steady state stability and quick transient response. This is achieved using digital, analog, or hybrid techniques to reject any disturbances; discrete or integrated components are usable to fashion the controller circuitry. To achieve the desired operating stability and transient response, a control variable ($I_{curve}$) is employed by the controller. A transient response portion of the commutation control part of the controller; i.e. PID module 65, is responsive to the fluctuations in the $I_{curve}$ signal to keep the controller from being driven into oscillation. As a result, the controller has zero steady-state error and good dynamic response. Also, the controller includes a mode controller which limits output power based upon the DC components of bus voltage and current.

The improved sensorless controller of the present invention operates by sensing the bus current waveform, producing a digital data stream representing the waveform, and sampling the data. Data samples are taken three times during each commutation interval. The time between samples is evenly spaced throughout the interval, so there is an initial, intermediate, and terminal sample taken. Based upon an evaluation of various combinations of the data, the controller combines the three samples taken for each commutation interval in accordance with a prescribed formula. The formula provides a linear response over substantially the entire range of commutation angle values. This linearity is observable for a wide range of motor operating speeds. The sample values, as combined by the controller according to the formula, are the control variable used to achieve the desired control.

It is further an important feature of the improved controller to define the motor's desired operating characteristics such as speed, motor torque, motor voltage, and fluid flow (where the controller is used in an appliance such as a clothes washer) for each particular operating mode. The controller is then responsive to changes in these values to adjust the relationship between the motor's rotor and stator phase windings so an "in phase" operating condition is achieved.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. Apparatus for controlling commutation of a dynamoelectric machine having a plurality of stator windings and a rotor for rotation with respect to said windings, comprising:

power supply means for supplying voltage to the windings, said power supply means having an output supply line and a return supply line;

means for sensing a current waveshape in at least one of the supply lines, said current having a waveshape the relative characteristics of which are a function of a commutation angle between the rotor and stator windings, the commutation angle providing an indication of whether the commutation is at an optimal angle, or lagging, or leading, and said current waveshape being distorted by ripple or transients on the supply lines;

commutation means for successively energizing the respective stator windings; and, processor means for deriving commutation angle information from the sensing means and for controlling operation of the commutation means on the basis of the information derived to adjust the commutation angle so it is optimal thereby to operate the motor in a stable and efficient manner, said processor means including means for processing a control variable which is a function of the commutation angle and combining said control variable with information representing the effects of bus ripple or transients on the control variable thereby to cancel from the commutation angle information any effects created by ripple or transients on the bus.

2. The apparatus of claim 1 wherein the power supply means includes a DC bus connected to the machine and the sensing means senses the bus current waveshape.

3. The apparatus of claim 2 wherein the commutation means includes an inverter between the bus and the machine, and the processor means supplies control signals to the inverter to control current flow to the stator windings.

4. The apparatus of claim 3 wherein the sensing means includes conversion means for converting the sensed current waveshape to a digital signal stream.

5. The apparatus of claim 4 wherein the processor means includes commutation controller means having means for sampling the current waveshape at three points during each commutation interval, the sampling means deriving the samples from the digital signal stream and producing a bus current input signal which is a function thereof.

6. The apparatus of claim 5 wherein the sampling means samples the current waveshape at an initial portion of a commutation interval, at an intermediate portion thereof, and at a latter portion thereof.

7. The apparatus of claim 5 wherein the commutation controller means further includes variable control means responsive to the three sample values taken during each commutation interval for combining the sample values in accordance with a predetermined formula.

8. The apparatus of claim 7 wherein the variable control means includes means for combining the sample values in accordance with the formula 2E–3M+B where E represents the last sample value taken during the commutation interval, M represents the intermediate sample value taken, and B represents the initial sample value taken during the interval, the control means producing a correction signal whose characteristics are function of the formula.

9. The apparatus of claim 8 wherein the commutation controller means further includes summing means for combining the bus current signal and the correction signal to produce a difference signal representing the error between a control variable and a reference value.

10. The apparatus of claim 9 wherein the commutation controller means further includes includes means for rejecting the ripple effects on the sensed bus current waveform.

11. The apparatus of claim 10 wherein the ripple rejecting means includes means for performing a convolution on a value representing the sensed bus voltage waveform derived from waveform samples, and a value representing the instantaneous dynamoelectric machine response to an impulse.

12. The apparatus of claim 11 wherein the output of the ripple rejecting means is a correction signal applied to the summing means to be combined with the sampled current waveform signal.

13. The apparatus of claim 10 wherein the ripple rejecting means includes means for combining a signal representing a bus voltage with a function representing the effect of ripple on the bus voltage and for combining the resultant signal with a reference voltage output signal to produce a voltage output signal supplied to the inverter.

14. The apparatus of claim 12 further including limiting means to which the difference signal is applied, the limiting means limiting the magnitude of the difference signal between an upper and a lower bound, the bounds representing the upper and lower limits of the correction realizable by the apparatus.

15. The apparatus of claim 14 further including processing means for processing the difference signal to derive a frequency signal output supplied to the inverter to control the commutation interval.

16. The apparatus of claim 15 wherein the processor means further includes mode controller means responsive to the operating mode of the machine to supply frequency and voltage signals to the commutation controller means, the frequency and voltage values represented by the outputs being a function of the machine operating mode, the mode controller means having as inputs values representing the machine's speed, torque, input voltage, and velocity of a fluid moved by operation of the motor.

17. The apparatus of claim 1 wherein the dynamoelectric machine is a three-phase electric motor.

18. Apparatus for controlling commutation of a polyphase electric motor having stator windings for each motor phase and a rotor for rotation with respect to said windings, comprising:

power supply means for supplying voltage to the windings, said power supply means including an AC power source, means for converting AC power to power having an average DC value and a bus for applying the average power to the motor;

commutation means for successively energizing the stator windings and including an inverter between the bus and the motor, the inverter controlling the commutation interval for each motor phase;

means for sensing the bus current, said current having a waveshape the relative characteristics of which are a function of a commutation angle between the rotor and stator windings, the commutation angle providing an indication of whether the commutation is at an optimal angle, or lagging, or leading, and said current waveshape being distorted by ripple or transients on the supply lines; and, processor means for deriving commutation angle information from the sensing means and for controlling operation of the commutation means on the basis of the derived information to control the commutation angle so it is optimal for a particular mode in which the motor is operating, said processor means including commutation controller means and mode controller means, said commutation controller means processing the commutation angle information and a control variable which is derived from the bus current waveshape to correct for any sensed distortions caused by the ripple or transients, and said mode controller means providing reference signals to the commutation controller means based upon the mode in which the motor is operating, and the processor means providing frequency and voltage inputs to the commutation means for the inverter to control the commutation interval as a function of the sensed bus current waveshape.

19. The apparatus of claim 18 wherein the sensing means includes conversion means for converting the sensed current waveshape to a digital signal stream.

20. The apparatus of claim 19 wherein the commutation controller means includes means for sampling the current waveshape at three points during each commutation interval, at an initial portion of a commutation interval, at an intermediate portion thereof, and at a latter portion thereof, the sampling means deriving the samples from the digital signal stream and producing a bus current input signal which is a function thereof.

21. The apparatus of claim 20 wherein the commutation controller means includes variable control means responsive to the three sample values taken during each commutation interval for combining the sample values in accordance with a predetermined formula.

22. The apparatus of claim 21 wherein the variable control means includes means for combining the sample values in accordance with the formula 2E–3M+B where E represents the last sample value taken during the commutation interval, M represents the intermediate sample value taken, and B represents the initial sample value taken during the interval, the control means producing a correction signal whose characteristics are function of the formula.

23. The apparatus of claim 22 wherein the commutation controller means further includes summing means for combining the bus current signal and the correction signal to produce a difference signal representing the bus current waveform corrected for transient effects thereon.

24. The apparatus of claim 22 wherein the commutation controller means further includes includes ripple rejecting means having means for combining a signal representing a bus voltage with a function representing the ripple on the bus voltage and means for combining the resultant signal with a reference voltage output signal to produce a voltage output signal supplied to the inverter.

25. The apparatus of claim 22 wherein the ripple rejecting means includes means for performing a convolution on a value representing the sensed bus voltage waveform derived from the waveform samples, and a value representing the instantaneous motor response to an impulse.

26. The apparatus of claim 25 further including limiting means to which the difference signal is applied, the limiting means limiting the magnitude of the difference signal between an upper and a lower bound, the bounds representing the upper and lower limits of the correction realizable by the apparatus.

27. The apparatus of claim 26 further including processing means for processing the difference signal to derive a frequency signal output supplied to the inverter to control the commutation interval.

28. The apparatus of claim 27 wherein the processor means further includes mode controller means responsive to the operating mode of the motor to supply frequency and voltage signals to the commutation controller means, the frequency and voltage values represented by the outputs being a function of the motor's operating mode, the mode controller means having as inputs values representing the motor's speed, torque, input voltage, and velocity of a fluid moved by operation of the motor.

29. A method of controlling the commutation angle in a dynamoelectric machine comprising:

supplying a bus current to the machine;

commutating windings of the machine by systematically energizing and de-energizing them with the current;

sampling a resultant bus current waveshape which has characteristics that are a function of a commutation angle between a rotor of the machine and the machine phase windings, as well the effects of bus ripple or transients on a bus voltage waveshape;

obtaining commutation angle information from the sampled current waveshape; and, controlling the commutation angle in response to the information obtained, said commutation angle control including calculating a control variable which is a function of the commutation angle and combining said calculated control variable with a value which is a function of the ripple on the waveshape and the machine's response to a transient.

30. The method of claim 29 sampling the current waveshape includes sampling the waveshape at at least three points during each commutation interval, a first sample being taken at an initial portion of a commutation interval, a second sample at an intermediate portion thereof, and the third sample at a latter portion thereof.

31. The method of claim 30 wherein the time period between the taking of the first and second samples and the second and third samples is substantially the same.

32. The method of claim 30 wherein sampling the current waveform includes converting current waveshape information from analog to digital values and the sampling includes deriving the samples from the digital signal stream and producing a bus current input signal which is a function thereof.

33. The method of claim 29 wherein obtaining commutation angle information from the sampled current waveshape includes producing a correction variable and combining the correction variable with the sampled waveform information.

34. The method of claim 32 wherein sample values for each commutation interval are combined in accordance with the formula 2E–3M+B to produce a correction signal, where E represents the last sample value taken during the commutation interval, M represents the intermediate sample value taken, and B represents the initial sample value taken during the interval.

35. The method of claim 34 further including summing the bus current signal and the correction signal to produce a difference signal representing the bus current waveform corrected for transient effects thereon.

36. The method of claim 35 further including rejecting the effects of an AC ripple on the bus current waveform.

37. The method of claim 36 wherein the rejecting the ripple includes performing a convolution on a value representing the sensed bus voltage waveform derived from the waveform or samples thereof, and a value representing the instantaneous dynamoelectric machine response to an impulse.

38. The method of claim 37 wherein ripple rejection includes combining a signal representing a bus voltage with a function representing the ripple on the bus voltage, and for combining the resultant signal with a reference voltage output signal to produce a voltage output signal supplied to the inverter.

39. The method of claim 35 further including limiting the difference signal between an upper and a lower bound, the bounds representing the upper and lower limits of the correction realizable by the apparatus.

40. The method of claim 39 further including processing the difference signal to derive a frequency signal output used for controlling the commutation interval.

41. The method of claim 40 further including supplying reference frequency and voltage signals used in processing the current waveform information, the reference signals having values which are a function of the motor operating mode, the mode controller means having as inputs values representing the motor's speed, torque, input voltage, and the velocity of a fluid moved by operation of the motor.

* * * * *